(12) United States Patent
Lobo et al.

(10) Patent No.: US 9,371,613 B1
(45) Date of Patent: Jun. 21, 2016

(54) ON-SITE EMULSIFICATION OF DEFOAMER FOR BROWNSTOCK WASHING OF PULP

(71) Applicants: Lloyd A Lobo, Lincoln University, PA (US); Todd S Bolton, Newark, DE (US); Michael Mitchell, Newark, DE (US); Kraig R Kent, Dothan, AL (US)

(72) Inventors: Lloyd A Lobo, Lincoln University, PA (US); Todd S Bolton, Newark, DE (US); Michael Mitchell, Newark, DE (US); Kraig R Kent, Dothan, AL (US)

(73) Assignee: Solenis Technologies, L.P. (CH)

( * ) Notice: Subject to any disclaimer, the term of this patent is extended or adjusted under 35 U.S.C. 154(b) by 0 days.

(21) Appl. No.: 14/601,368

(22) Filed: Jan. 21, 2015

Related U.S. Application Data

(60) Provisional application No. 61/935,366, filed on Feb. 4, 2014.

(51) Int. Cl.
| | |
|---|---|
| *D21C 7/00* | (2006.01) |
| *D21H 17/59* | (2006.01) |
| *D21H 11/00* | (2006.01) |
| *D21C 9/02* | (2006.01) |

(52) U.S. Cl.
CPC ............... *D21H 17/59* (2013.01); *D21C 9/02* (2013.01); *D21H 11/00* (2013.01)

(58) Field of Classification Search
CPC .............. D21C 7/00; D21C 9/02; D21H 17/59
USPC ......................................................... 162/57
See application file for complete search history.

(56) References Cited

U.S. PATENT DOCUMENTS

| | | | |
|---|---|---|---|
| 4,024,072 | A | 5/1977 | Shane et al. |
| 4,032,473 | A | 6/1977 | Berg et al. |
| 4,088,601 | A | 5/1978 | Shane et al. |
| 4,225,456 | A | 9/1980 | Schmidt et al. |
| 5,380,464 | A | 1/1995 | McGee et al. |
| 6,162,325 | A | 12/2000 | Raslack et al. |
| 6,512,015 | B1 | 1/2003 | Elms et al. |
| 6,605,183 | B1 | 8/2003 | Rautschek et al. |
| 7,550,514 | B2 | 6/2009 | Rautschek et al. |
| 7,619,043 | B2 | 11/2009 | Rautschek et al. |
| 7,645,360 | B2 | 1/2010 | Burger et al. |
| 2010/0300632 | A1 | 12/2010 | Duggirala et al. |

FOREIGN PATENT DOCUMENTS

| | | |
|---|---|---|
| CN | 102174778 | 12/2012 |
| EP | 0163541 | 5/1985 |
| JP | 8309104 | 11/1996 |
| JP | 2000246010 | 9/2000 |

OTHER PUBLICATIONS

Denkov, Nikolai D. et al., "Mechanisms of Action of Mixed Solid-Liquid Antifoams, 1. Dynamics of Foam Film Rupture", Langmuir, vol. 15, pp. 8514-8529, 1999.
International Search Report, PCT/US2015/012147, p1, May 11, 2015.

*Primary Examiner* — Mark Halpern
(74) *Attorney, Agent, or Firm* — Michael J. Herman; Joanne Rossi

(57) ABSTRACT

The present method is directed to an on-site process for conveying an emulsion of one or more substantially water-free fluids or compositions to a brownstock washing process. This enables real-time adjustment of wash aids and other process aids thus improving the overall operation of brownstock washing.

19 Claims, 3 Drawing Sheets

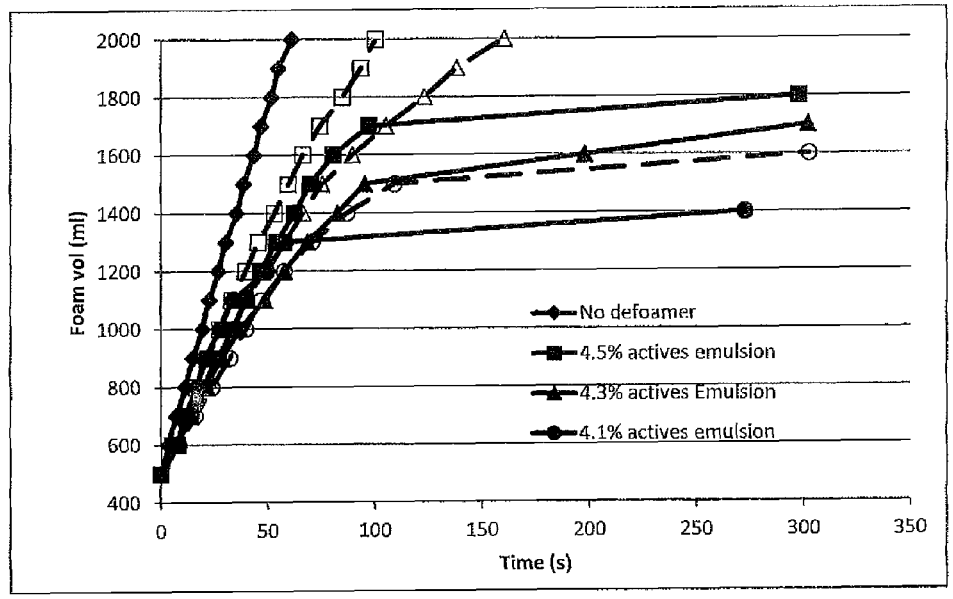

Figure 2

Solid line with diamond marker – no defoamer was added to the black liquor.

Solid lines with solid square, solid triangle, solid circle – emulsions made at 4.5, 4.3 and 4.1% actives respectively.

Dashed lines – Conventional defoamer emulsions formulated with thickeners and surfactants. Open square has same actives as solid square, open triangle has the same actives as solid triangle and open circle has same actives as solid circle,

Median drop size over time for emulsion generated via steady state operation and batch operation using equipment depicted in Figure 1.

ON-SITE EMULSIFICATION OF DEFOAMER FOR BROWNSTOCK WASHING OF PULP

This application claims the benefit of U.S. provisional application No. 61/935,366, filed 4 Feb. 2014, the entire contents of which are hereby incorporated by reference.

BACKGROUND

In the manufacture of cellulosic pulp from wood chips, wood chips are subjected to high-temperature conditions to separate lignin from cellulose fibers. The lignin is then solubilized in a cooking medium. There are three main chemical treatment processes that are currently used in the manufacture of cellulosic pulps such as acid sulfite, soda and kraft treatment processes. Soda and kraft processes are accomplished at high pH while the acid sulfite treatment is done under acidic conditions.

In all three of these processes the step subsequent to cooking the lignin is the step of washing the pulp to separate dissolved lignin from fibers. Because lignin is a complex organic molecule, products of the cooking step can create fragments that are surface active, which helps stabilize foaming. Additionally, other organics originating from resins in the wood, such as fatty acids and sterols, are also present and are potent foaming agents and can thus create issues in the pulp washing process due to excessive foaming.

The unit operation of washing cellulosic fiber uses a combination of dilution and displacement washing. In order to use the least amount of water or other rinse fluid, good mixing is required, which often results in foam formation. This foam has negative consequences to the washing operation. The foam fills the process equipment and reduces capacity in the washer vats and filtrate tanks for the black liquor and the air bubbles in the fiber slurry get trapped in the fiber mat which is formed during washing and prevents efficient washing of the pulp. For these reasons brownstock washing operations typically use wash aids as a process aid that is fed at different points of the washing operation. For one skilled in the art it is recognized that brownstock washing operation is any process or unit operations between the digestion step to final pulp storage where the dissolved, colloidal or suspended solids are separated from the cellulosic fiber. It is envisioned that the current method can be used not only with all types of Brownstock washers including displacement washers and rotary vacuum washers, but also wherein the cooked chips, which are not yet disintegrated into individual fibers, are washed within the digesters, examples of which are pressure diffusers. The present composition can also be added after other delignification steps for the cellulose, such as in oxygen/ozone/peroxide delignification and other the bleaching and/or extraction stages.

Conventional defoamer products are water-based emulsions and contain emulsified droplets of active defoaming ingredient within a continuous water matrix. The method by which these drops affect defoaming is well known and is described in *Langmuir*, vol 15, pg. 8514, 1999. The composition of the active ingredient, known and practiced in the art, can be quite varied. The substantially water-free fluids of this invention can comprise, but are not limited to, any of these compositions. One class of active defoaming composition is paraffinic oils or mineral oils, which are typically mixtures with a wide range of carbon chain lengths. Although lower carbon chain length molecules can be effective, they are typically avoided due to VOC and environmental issues. Therefore, most mineral oils are restricted to have molecules with carbon chain length greater than 12. In addition to the mineral oil, hydrophobic particles need to be incorporated into the mineral oil. Typically, hydrophobically modified silica particles or particles of wax such as ethylene bis-stearamide are used, although other types of hydrophobic particles may also be employed. The hydrophobic particles are typically used at a level of 2%-30% in oil phase. Other oils that can be used as the substantially water-free fluid include vegetable oils which are mixtures of tri-glycerides, long-chain alcohols (C>10), polypropylene glycol, and polyethylene/polypropylene copolymers.

There are several types of agents used as brownstock wash aids and can be classified by their chemical composition. Mineral oil based wash aids are typically used as defoamers, and typically contain hydrophobic particles like silica or ethylene bis-stearamide. These were the most common type of wash aid or defoamer a few years ago. However, with the introduction of organo-silicone based wash aids, their use has decreased. The simplest form of organo-silicone wash aids or defoamers are mixtures of polydimethyl siloxane (PDMS) fluid containing hydrophobic particles, such as hydrophobic silica. Substantially, more efficient wash aids typically used as defoamers or antifoam agents are organo-silicones that are modified. U.S. Pat. No. 5,380,464, discloses branched siloxanes in combination with polyether/siloxane copolymers. Mixtures of siloxanes with branched or crosslinked polyether/polysiloxane copolymers, optionally containing a filler such as silica are taught in U.S. Pat. No. 6,605,183 and U.S. Pat. No. 6,512,015. EP Patent Application No. 163,541 disclose silicone-based defoamers in which PDMS is replaced with silicone resin, which is a partially crosslinked organo-silicone compound. U.S. Pat. No. 7,645,360 and U.S. Pat. No. 7,550,514 disclose incorporating aliphatic groups within the silicone compound and U.S. Pat. No. 7,619,043 discloses incorporating phenyl groups within a compound. U.S. Pat. No. 6,512,015, U.S. Pat. No. 7,645,360, disclose organo-silicone compounds containing polyethers—ethylene oxide and propylene oxide are mixed with the silicone resin made with PDMS and silica.

While the organo-silicones are able to perform quite well when added directly to a pulp slurry during the washing step, there are several advantages to being able to emulsify hydrophobic silicone materials into water and then introduce them into the pulp slurry. Their effectiveness is enhanced, and the potential to deposit is reduced. Consequently, the organo-silicone resins are sold as prepared emulsions. While these emulsions have an enhanced effectiveness there are issues that arise in the manufacture and distribution of these products. Organo-silicones are very difficult to emulsify and stabilize over a long period of time. Because of their lower density, the emulsion drops tend to rise to the top (cream or phase separate) over time. The term emulsion is used to refer to a two phase system with liquid droplets in a continuous liquid medium. This can be mitigated by adding viscosifiers, but the dispersibility of these emulsions into the pulp stream becomes more difficult. Viscosifiers or thickeners are often gums which will increase the propensity to be contaminated by microbial organisms. Also, because emulsions are hard to stabilize, they are more prone to coalescence and consequently it is harder to make concentrated emulsions. Typically emulsions have to be prepared at less than 50% actives and more typically they are around 30% actives. Because of the high volume of water in these emulsions the cost to make (larger vessels) and transport them to the site they are being used at, based on the level of actives, is cost prohibitive.

Therefore, it would be desirable to be able to make and ship a product that is 100% active and to emulsify the wash aids at the customer site with a simple and inexpensive method, Several previous attempts have been made to emulsify organo-silicones on-site. One method is to make the organo-silicone material self emulsifiable. Chinese Patent Application No. 10/2174778 discloses a formulation to make a PDMS/hydrophobic silica mixture self emulsifiable by incorporating silicone polyether (SPE) and emulsifiers such as ethoxylated alcohols. Japanese Patent No. 2000/246010 and Japanese Patent Application No 08/309104 disclose compositions that are alleged to be self-emulsifiable. While self-emulsifiable compositions can aid in the emulsification of wash aids or defoamers, they present several issues. One issue is that the sizes of the drops still depend on the shear rate present in the process stream, which is not always controllable. Another issue is that the ingredients used to make the silicone self-emulsifiable can affect the performance of the silicone as a defoamer. There have been some attempts to enhance the performance of defoamers by enhancing the mixing at the feed point in the customer process. U.S. Patent Application No. 2010/0300632A discloses a mixing valve to enhance the mixing at the feed points for many different additives, but would not be very effective at emulsifying organo-silicones. U.S. Pat. No. 6,162,325 discloses mixing two streams of process aids wherein at least one defoamer and one emulsifier is mixed and fed to a washer. As the defoamer is delivered and added to the wash system in "neat" form, the emulsifier is mixed with the defoamer in an amount of from about 1% to about 20% by total weight of the defoamer composition prior to the defoamer/emulsifier composition being injected into the washer. Since the defoamer added to the system is added "neat" or not pre-emulsified, the emulsifier enhances the ability of the defoamer to disperse into drops defoamer once it is introduced to the washer. While the improvement in dispersibility is desirable, it is not always sufficient because the drop formation also depends on the shear applied and each washer and the defoamer feed points offer different levels of shear, some of which may not be sufficient for desired drop size.

All references cited within this application are incorporated herein in their entirety.

There exists a need to be able to emulsify a substantially water-free silicone wash aid at the site where it can be used soon after its emulsification in the application of interest. Furthermore, it has been found that two or more brownstock washing aids having different performance characteristics, when simultaneously mixed and emulsified can achieve the desired defoaming and other characteristics can be realized in real time.

SUMMARY

The present invention is directed to an on-site process for conveying an emulsion of one or more substantially water-free fluids or compositions to a brownstock washing process. This enables real-time adjustment of wash aids and other process aids thus improving the overall operation of brownstock washing.

The substantially water-free fluids of the present invention have a Brookfield viscosity when using a no. 6 spindle, of less than about 40,000 centipoise (cP) when measured at 25° C. The water-free fluid(s) is mixed with water and subjected to a shearing force of at least 5,000 s$^{-1}$ creating an emulsion wherein the emulsion or portion of the emulsion can be recycled back through the shearing means; can be immediately sent to a brownstock washing vessel(s) or held for a period of time prior to being conveyed to the brownstock washing vessel(s). Additionally, the components of the substantially water-free fluid(s) or composition(s) that transfers to the water phase should increase the viscosity of the water by no more than a factor of 10 and can be by no more than a factor of 5 and may only increase by a factor of 2.

In another embodiment, the current method can be used with all types of brownstock washing such as displacement washers such as single and multi-stage ring diffusion washers and pressure diffusion washers and rotary vacuum washers such as rotary pressure washers, diffusion washers and horizontal belt filters and wash presses and can be used in digester washing processes.

In one embodiment of the present invention the one or more substantially water-free fluids comprise one or more surfactants having an average hydrophilic lypophilic balance (HLB) of greater than about 5. When more than one water-free fluid is used, each water-free fluid can be separately combined with water or the water-free fluids can be combined and mixed prior to combining and emulsifying with the water. The water-free fluids and water can be combined and then subjected to a shearing means or the water-free fluids and water can be sheared simultaneously when coming into contact with each other. The process for conveying the amount of washing aid to the brownstock washer can be manually or automatically controlled thereby.

These and other features, aspects, and advantages of the present invention will become better understood with regard to the following description, appended claims, and accompanying drawings.

DRAWINGS

FIG. 2, shows the foaming tendency of the black liquor with the different defoamer emulsions relative to the black liquor without any defoamer.

DETAILED DESCRIPTION

Figure 1:
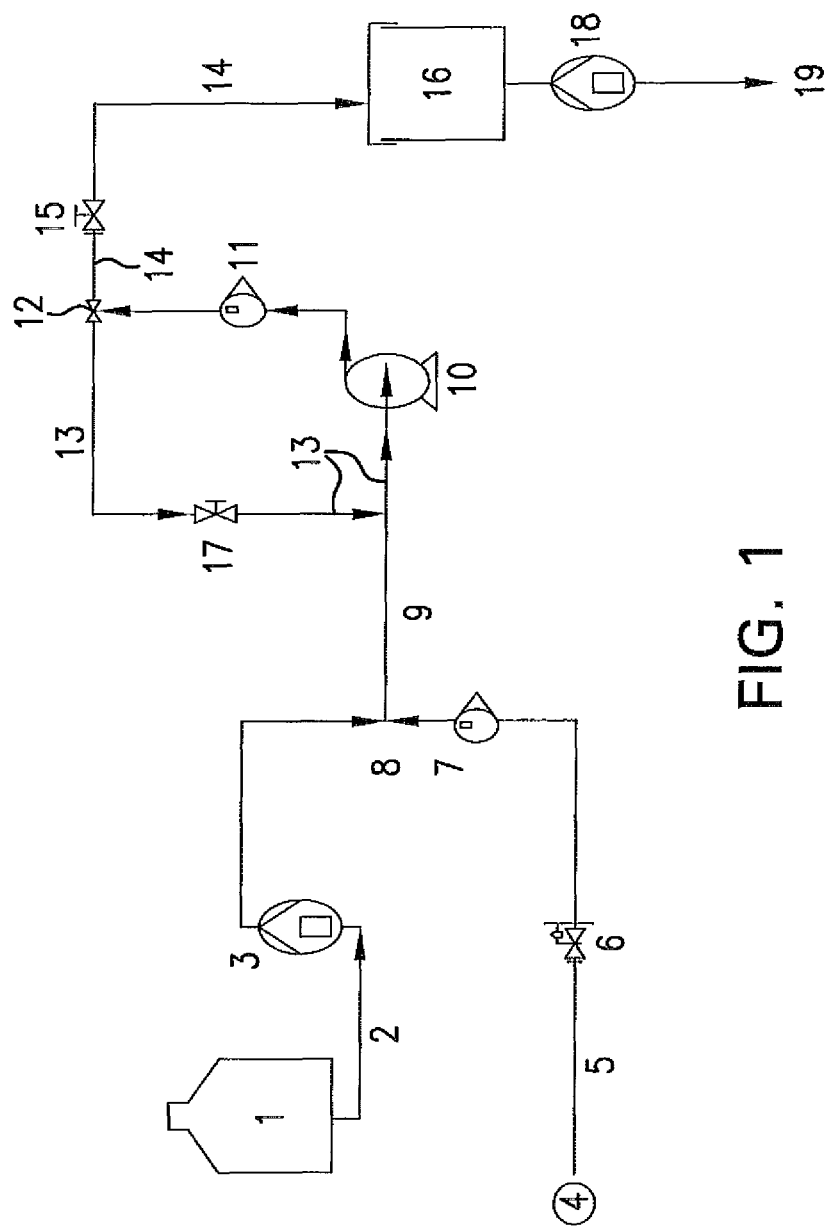
FIG. 1, shows a general schematic of the main features of the improved process of delivering an emulsion to a brownstock vessel.

The invention relates to wash aids and in particular defoamers or anti-foam compositions that are used in brownstock washing operations in pulp mills. In particular the invention relates to a process of delivering the wash aids to brownstock washers.

One active ingredient that can be used as a defoamer in the current process is an organo-silicone which optionally incorporates fillers such as hydrophobic silica. The composition of the organo-silicones include linear and branched siloxanes, silicone resins which may be primarily crosslinked siloxanes, linear and branched polyether/polysiloxane copolymers, polyether/polysiloxane copolymers that are crosslinked, and mixtures of these. In certain applications the siloxanes may have functional groups attached to them, such as those discussed in the Background section and which references are incorporated into the current application. Optionally, the active ingredient may have filler materials incorporated in them. Preferred fillers are silica, waxes such as ethylene bis-stearamide, and inorganic particles. The filler materials may be present at a level from 0.1 to 30% by weight of the composition of the water-free fluid. Other non-silicone compositions such as mineral oils, vegetable oils, long-chain alcohols (C>10), polypropylene glycol, and polyethylene/polypropylene copolymers may be blended in with the organo-silicone.

For the purposes of brownstock washing, it is known in industrial practice that effective drainage and washing of pulp fibers is desired in addition to defoaming. While siloxanes and mixtures of siloxanes are known to be good defoamers for black liquor present in brownstock washing operations, silicone polyethers and other surface active materials are known to be effective in improving the drainage of pulp mats and aiding the displacement washing of these mats, as disclosed in Tappi J., vol 12, no. 2, 2013. Some examples of polyethers that can be used are comprised of ethylene oxide and propylene oxide and the polyether may be comprised of ethylene oxide alone, propylene oxide alone or random or block copolymers of ethylene and propylene oxide. The polyether may contain both propylene oxide and ethylene oxide units and the weight % of the propylene oxide in the polyether is at least 50%. Silicone polyethers that are useful for drainage include structures where the polyether is hanging off a silicone backbone as in a comb type structure or as an A-B or A-B-A structure, where A represents the polyether and B represents the silicone backbone. The molecular weight of the silicone polyether can be greater than 1000 daltons and may be greater than 10,000 daltons.

In typical pulp mill operations, seasonal and operational variations result in variable needs for defoaming and pulp mat drainage/washing. Therefore, it is beneficial to be able to treat the washer with a product that meets the variable needs of the brownstock washing operation. We have found that by feeding two or more water-free compositions and water to a shearing means or device, and wherein one of the compositions is more effective at defoaming and the other is more effective at improving pulp mat drainage, a much improved washing process results.

In addition to silicone polyethers, other surface active materials include, but is not limited to, ethoxylated alcohols, alkoxylated mono- and diglyceride esters, sorbitan esters and alkoxylated sorbitan esters can comprise the entire substantially water-free composition or be mixed with organo-silicones. The substantially water-free fluid that is effective for improving drainage can also be blended with organo-silicones that are effective for defoaming as disclosed above. Thus, in some applications the use of more than one substantially water-free fluids may be desirable.

The term substantially water-free fluid(s) and water-free fluid(s) are used interchangeably throughout the Specification and are intended to be substantially devoid of water. However, small levels of water may be inherent in the manufacture of some of the active ingredients or additives. Furthermore, depending on the environmental conditions some amount of condensation of water may occur during preparation and transport of the product. Water-free is defined as the water content being less than 5% by wt. of the entire water-free fluid.

Because the substantially water-free fluids are expected to emulsify with the water when using a shearing means, there is a limit on the viscosity of the fluids or composition. It was found that with shearing devices being used today, the fluid viscosity should be less than 70,000 cps at the temperature of emulsification and can be less than 10,000 cps.

In one embodiment, one or more substantially water-free compositions is combined with water, wherein the water-free composition comprises from about 0.1% to 30% and can be from about 5% to about 20% by weight of the total composition.

To emulsify the substantially water-free compositions, certain emulsifiers or surfactants may be necessary. The emulsifiers or surfactants can be added directly or indirectly to the substantially water-free compositions. Examples of emulsifiers or surfactants that can be used alone or in blends include, but are not limited to, nonionic surfactants such as ethoxylated alcohols, sorbitan esters with fatty alcohols and alkoxylated versions of the same, alkoxylated mono and diglycerides esters with fatty acids, silicone polyethers, propylene oxide/ethylene oxide copolymers; anionic surfactants with sulfate, sulfonate, carboxylate, phosphate and phosphonate groups; and polymers such as polyethylene oxide, polyvinyl alcohol, lignin, and maleic acid/acrylic acid copolymers.

The surfactants can be nonionic surfactants with an HLB greater than about 5. If a blend of surfactants is used, the weighted average HLB should be greater than about 5. The nonionic surfactants can be ethoxylated alcohols, silicone polyethers and their blends.

In addition to the above mentioned components, other functional materials such as biocides and viscosifiers may be added to the water-free fluids. However, the one benefit the current invention offers, is the ability to prepare wash aid emulsions and to feed said emulsions to a brownstock washer over a short period of time. Viscosifiers added to increase the viscosity of the water part of the emulsion are typically added to improve the long term stability of the emulsion. As shown in the examples, these are detrimental in their ability to disperse within the black liquor. Thus, if viscosifiers are present in the water-free fluid of the current invention, they should be such that they do not increase the viscosity of the water phase, when mixed with the water, by more than a factor of 2. Water soluble viscosifiers such as gums, cellulosics, nonionic and ionic polymers and latexes are typically not preferred with respect to the current invention.

FIG. 1, is a schematic showing one embodiment of the present invention. The numbering system in the following embodiment is based on the schematic shown in FIG. 1. According to the present invention, one or more wash aids comprising substantially water-free compositions are pumped from one or more storage vessel(s) (1) and combined with water at a junction point (8) the water coming from a water source (4). The water-free composition and water can be immediately or subsequently subjected to a shearing means (10), thus creating an emulsion. The emulsion can then be a) split into two separate streams at junction (12) with one stream going to an optional product tank (16) or the Brownstock washer (19) and the other stream can be recycled or recirculated (13) back through the shearing means (10); or b) the total volume of emulsion can be sent directly to the product tank (16) or Brownstock washer(s) (19).

In another embodiment, a shearing means (10) is located at junction (8), wherein the water and water-free composition(s) are sheared immediately upon contact. There could also be multiple shearing means in the process.

To emulsify the substantially water-free fluids at the customer site, the fluids have to be mixed or combined with water while being subjected to high shear either simultaneously upon contact or shortly thereafter. In order to obtain consistent performance of the defoamer in the brownstock washer, the ratio of the active ingredients, i.e. the amount of water-free composition to water has to be precisely controlled.

In one aspect of the current method the substantially water-free fluid is moved from a storage tank using any fluid-moving or pumping means and whose pumping ability can be manually or automatically controlled, without limitations, examples of types of pumps that can be used for the water and water-free fluids are centrifugal pumps, piston pumps, tube pumps, progressive cavity pumps, and gear pumps. The flow rates can be controlled by a flow rate regulator means, such as a flowmeter. Some examples of flowmeters that can be used in the current process, are magnetic flowmeters, Coriolis flowmeters, paddlewheel flowmeters and rotameters. Other methods that can be used to deliver a precise flow rate are the use of well-calibrated metering pumps, which would obviate the need for a flow verification device. Gear pumps, progressive cavity pumps, diaphragm pumps, and piston pumps are examples of such metering pumps.

For compositions that have a source or line pressure, such as when water is sourced from a supply line, a regulator, control valve or flowmeter can be used to deliver precise flow rates. All the above mentioned configurations and combinations of these can be used to select an appropriate delivery system for each of the fluid streams.

The pumping means can be used in combination with a flow rate measuring means and a flow rate regulator means to provide automatic control of the process. In an automated process, an automatic feedback controller uses the measured flow rate signal from a flow rate measuring means to the flow rate means thus controlling the pump output. Various control algorithms are known in the art to convert the measured flow rate signal to a controller of a pump.

The ratio of substantially water-free fluids to water is one factor that determines drop size or drop diameter of the emulsion. If the ratio of water-free fluid to water is too high it is difficult to prepare an oil-in-water type emulsion. Thus it is desired that the ratio of water-free fluid to water should be between from about 0.01:1 to about 1:1. The stability of the emulsion and the ability to emulsify improves as this ratio is dropped. If the ratio of the substantially water-free fluids to water is too low, larger pumps and shearing devices will be needed thus increasing capital cost of the unit operation, i.e. shearing means and ancillary equipment. Moreover, the amount of actual emulsion needed to be effective in the washer is higher and will increase the required amount of washing aid being pumped to the brownstock washer.

In one aspect of the invention the total amount of substantially water-free fluids comprises from about 1% to about 50% by weight of the emulsion and can be from about 5% to about 20% by weight of emulsion.

In instances where multiple water-free fluid streams are being used for the purpose of affecting different characteristics of the brownstock washing operation, such as defoaming and pulp mat drainage, it may be desirable to control the flow rates of the individual water-free fluid streams based on the performance of the washer. One method of enabling this feature is to measure the responses of the washer that are desired to be affected and use a controller to set the pump flow rates for the individual water-free fluid streams. For example, to control the defoaming in the washer, the foam height can be measured at any relevant part of the washer system. When the foam level rises the pump flow rate on the water-free fluid that affects defoaming can be increased based on a pre-set control algorithm. Similarly, if mat drainage is slow a parameter of the unit operation that is sensitive to drainage, such as drum speed in a vacuum drum washer or pressure in a pressure washer, can be measured and used to change the pump flow rate on the water-free fluid that affects drainage the most. Additionally, to maximize the effectiveness of the defoamer, the two components can be combined at an optimum ratio so as to control the foam and to increase the drainage.

In some embodiments the precisely metered flows of water and water-free fluids can be combined by a simple pipe tee leading to a shearing means. More elaborate mixing configurations such as static or dynamic in-line mixers can also be used to mix the water and water-free fluid prior to going through a shearing means. If multiple water-free fluid streams are desired, they can either be mixed before introducing the water or they can all be mixed at the same point.

In another embodiment, the precisely metered flows of water and water-free fluids can be combined directly at the shearing point.

One component of the current process is the shearing means that emulsifies the drops of the water-free compositions into the water phase. Any device that provides a substantial shear of at least 5,000 s$^{-1}$ will provide enough energy to emulsify the drops. One type of shearing device that can be used in the current invention is a rotor-stator type device, where the rotational speed controls the rate of shear. The approximate shear rate of a given rotor-stator device can be obtained using the following equation:

$$\dot{\gamma} = \pi DN/g,$$

wherein $\gamma$ is the shear rate in s$^{-1}$;

$\pi$ is the constant approximately equal to 3.14;

D is the diameter of the rotor in m;

N is the rotational speed in rev/s; and g is the gap between rotor and stator in m.

To get a high shear rate, the rotational speed should be high and the clearance between rotor and stator device should be small. Examples of such rotor-stator devices that are good for emulsification are the DISPAX-REACTOR® made by IKA® and Silverson® High Shear Mixers made by Silverson Machines, Inc. Rotor-stator devices have one or more stages, where each stage has a rotor-stator element. For the purposes of the current invention single and multiple stages can be used. Centrifugal pumps can be used, for example a turbine pump, which has a series of blades which comprise an impeller. The blades are recessed into a path or raceway with a tight tolerance. A Burks turbine pump which has the ability to adjust the clearance between the rotor (blades) and stator (raceway), is another example of a high-shear mixing device. The turbine pump offers the advantage in that it both emulsifies the water-free fluids and conveys the emulsion to the washers. Additionally, the shear rate can be adjusted by changing the clearance of the blades rather than adjusting the rotational speed with a variable speed drive.

Other methods of obtaining high shear include pumping the fluid mixture through a properly designed Venturi orifice or constriction. Another type of high shear device that could be used with the current invention is a single or multi-stage homogenizer. In fact, any shearing device that has the ability to exceed a minimum shear rate of 5000 s$^{-1}$ is capable of creating drops of a desired size.

In most instances the residence time of the fluid in the high shear device is usually on the order of a micro-second and generally less than a second. Therefore, the process of emulsification is not always complete in a single pass through the device. When the viscosity of the substantially water-free compositions is high, the time required to break the drop is higher and therefore the probability of the fluid to decrease in size is lower for a single pass through the device. Therefore it may be desirable to recirculate a portion of the discharge back through the shearing means. In fact, it was discovered that re-circulating from about 50% to 99.5% of the discharge back through the shearing means, the drop size of the emulsion can be substantially reduced, to provide for a product with higher stability and improved performance. The recycle ratio is defined as the flow rate of fluid re-circulated back to the inlet of the shearing means divided by the total discharge flow of the shearing means. If the recycle ratio is too low the water-free fluid may not be emulsified into drops that are small enough for effective defoaming. If the recycle ratio is too high, the size of the device required for a given output, will have to be large thus increasing the cost of the shearing means and ancillary equipment.

In one embodiments of the invention, at least 10% of the total amount of emulsion exiting the shearing means is recycled back through the shearing means prior to feeding the emulsion to a product holding tank or to a brownstock washer. In other embodiments from about 30% to about 99.5% of the total emulsion can be recycled and can be from about 90% to about 95% that may be recycled.

For the purpose of convenience, it is sometimes desirable to have a temporary storage unit or product tank (16) between the outlet of the shearing means (10) and the feed line (19) to the brownstock washer (see FIG. 1). The storage unit or product tank (16) can serve the purpose of a buffer to accommodate for fluctuations in the demand for the product. Because silicone emulsions in the absence of viscosity stabilizers have a tendency to phase separate, the product tank (16) should have a means to agitate the contents. One method of providing such agitation is by means of a stirring device such as a rotating propeller or blade. Another means of providing agitation is by recirculating the contents of the product tank using a pump. Another option is to use the shearing means (10) that is used for the emulsification of the water-free fluids by providing recirculation as shown by the flow stream (20) in FIG. 1.

The object of the optional storage/product tank (16) is to provide temporary storage to mitigate fluctuations in product demand, mechanical problems with the emulsifying apparatus and other such temporary problems. Storage times would generally be less than 8 hours and typically less than about 4 hours in order to maintain the quality of the product in the absence of viscosity stabilizers.

The following examples are provided to illustrate the process for introducing washing aids into a brownstock washer.

EXAMPLES

Measurement Methods

Viscosity: Viscosity was measured using a Brookfield RV viscometer. A number 6 spindle was used and the temperature was maintained at 25° C. The rotational speed varied between 10-50 revolutions per minute (rpm) and the viscosity is measured in centipoises (cps).

Drop Size: A Horiba LA-300 Laser Diffraction Particle Analyzer was used to measure the drop size distribution. For the silicone-based water-free compositions a refractive index of 1.40 was used.

Foaming Measurements: 300 milliliter (ml) of a black liquor at 80° C., from a mill processing southern softwood, was taken in a heated glass 2000 ml graduated cylinder. A diffuser stone connected to an air line with Tygon® tubing was placed at the bottom of the cylinder. Air at a flow rate of 0.6 ml/minute (min.) was sparged through the diffuser stone. Foam was generated at the top of the black liquor column and its height was measured as a function of time.

Example 1

The substantially water-free compositions were prepared by mixing 44 parts of a silicone resin, 44 parts of a 100 cSt silicone fluid, and 12 parts of a silicone polyether, with an additional 3 parts of a low-HLB ethoxylated alcohol and 6 parts of a high-HLB ethoxylated alcohol as emulsifiers. The viscosity of the water-free composition was measured to be 11,150 cps. 190 g tap water was measured into a 500 ml glass container. A Silverson Lab Mixer L5-M with a ¾" tubular head was used as a shearing device and was immersed into the container with water. The mixer was turned on to the desired speed. 10 g substantially water-free composition was dosed over a period of 1 minute while the shear device was running. After introduction of the substantially water-free composition, the shearing was continued at the desired speed for 30 minutes. A sample of the emulsion was used to measure the drop size. Using the method described above, the shear rate was calculated using equation 1, based on a rotor diameter of 0.75" and gap width of 250 micrometers (μm). Table 1 shows the resulting drop size as a function of shear rate.

TABLE 1

| Rotor Speed (rpm) | Calc. Shear Rate ($s^{-1}$) | Median Drop Size (μm) |
|---|---|---|
| 8100 | 32318 | 45.15 |
| 4000 | 15959 | 51.10 |
| 2000 | 7980 | 69.52 |
| 1000 | 3990 | 87.32 |
| 500 | 1995 | 136.09 |

It is seen that as the shear rate decreases, the drop size of the emulsion increases. For the purpose of defoaming without causing deposition of the drops, it is preferred that the drops have a median particle size less than about 70 μm. Therefore, the shear rate should be at least 5000 $s^{-1}$.

Example 2

Water-free compositions were prepared with and without emulsifiers. The first substantially water-free composition was prepared by mixing 44 parts of a silicone resin, 44 parts of a 100 cSt silicone fluid, and 12 parts of a silicone polyether, with an additional 3 parts of a low-HLB ethoxylated alcohol and 6 parts of a high-HLB ethoxylated alcohol as emulsifiers. The second composition was prepared by mixing 44 parts of a silicone resin, 44 parts of a 100 cSt silicone fluid, and 12 parts of a silicone polyether without any emulsifier. The procedure described in Example 1, was used to make separate emulsions with each of the water-free compositions at a 5% concentration. The mixing time was reduced from 30 minutes to 5 minutes. With the first water-free composition a stable emulsion was obtained whose median drop size was measured to be 30.5 μm. With the second substantially water-free composition, the silicone mixture coalesced into large drops (>5 mm) in diameter which floated to the top of the water and stuck to the sides of the glass container and the impeller of the shearing device.

In order to process the substantially water-free fluid into a usable emulsion which does not form deposits, one or more emulsifiers may be used in the formulation.

Example 3

Substantially water-free compositions of varying viscosity were prepared by changing the ratio of silicone resin to 100 cSt silicone fluid. The silicone polyether (SPE) level was set at a fixed amount of 12 parts. The amounts of the low-HLB and high-HLB ethoxylated alcohol surfactants were set at 3 and 6, respectively. Emulsions were prepared with each of the substantially water-free fluid compositions, using the method described in Example 1, with the rotor speed fixed at 8100 rpm, which corresponds to a shear rate of 32,318 $s^{-1}$. The agitation time was set at 5 minutes. After 5 minutes the sample was taken from the beaker and the drop size was determined with the Horiba as described above. The median drop size was calculated and the viscosities of the substantially water-free fluid compositions were measured by Brookfield viscometer. Table 2, shows the effect of viscosity of the water-free fluid on the size of the drops that can be emulsified.

TABLE 2

| Parts Resin | Parts 100 cSt Silicone Fluid | Parts SPE | Parts Low-HLB Emulsifier | Parts High-HLB Emulsifier | Viscosity (cP) | Median Drop Size (μm) |
|---|---|---|---|---|---|---|
| 88 |    | 12 | 3 | 6 | 149,800 | 57.76 |
| 77 | 11 | 12 | 3 | 6 | 70,530  | 46.50 |
| 66 | 22 | 12 | 3 | 6 | 33,850  | 30.93 |
| 44 | 44 | 12 | 3 | 6 | 18,450  | 28.97 |
| 55 | 33 | 12 | 3 | 6 | 11,150  | 32.85 |
| 33 | 55 | 12 | 3 | 6 | 5,100   | 25.46 |

The example clearly demonstrates that even with high shear rate, when the viscosity of the water-free composition exceeds 70,000 csp, the ability to create small drop sizes becomes inadequate.

A general schematic of the process used to continuously generate an emulsion according the current invention is shown in FIG. 1. A substantially water-free fluid is stored in one or more tanks (1) which are connected to a pumping/regulator means (3). A pressurized water source (4) is connected to a regulator means (6) followed by a flow rate measuring means (7) for measuring the flow rate of the water. The water stream (5) and the substantially water-free fluid stream (2) (can be multiple streams) are combined at a junction point (8) where the separate lines meet. The combined streams (9) are fed to a shearing means (10) to produce an emulsion and then through a second flow rate measuring means (11), which measures the total output of the combined streams (9) (water/water-free mixture) and the recycle stream (emulsion) (13) exiting the shearing means (10). The stream exiting the shearing means is split into two separate streams (12) wherein one stream (14) feeds through a regulator means (15) to a product storage tank (16). The second stream (13) is recirculated or recycled through a regulator means (17); and back through the shearing means (10). The regulator means (17) can be used to completely shut off the recirculation or recycle stream (13) that goes back through the shearing means.

Another regulator means (15) controls the volume of the total product (water+substantially water-free emulsion) going to the storage/product tank (16) or in the case where there is no storage tank, the product that goes straight to the washer.

In one embodiment, a pumping/regulator means (18) can be used to regulate the amount of washing aid that goes to the brownstock washer (19).

In one embodiment, the contents in the optional storage/product tank (16) can be agitated to maintain emulsion stability by a tank agitator.

In yet another embodiment, the product stream (14) or contents of the storage/product tank (16) can be recycled back to the shearing means (10) via stream (20). The amount of product going back through this recirculation loop can be controlled by a regulator means (21) therefore controlling the amount of product going back through the shearing means (10).

The pumping/regulator means (3), in addition to pumping the substantially water-free fluid, controls the flow rate of the water-free fluid while the flow rate of the water is regulated by controlling means (6). By using the pumping means (3) and combination regulator means (6) and flow measuring means (7) the flow rates of the two separate feeds (water (4) and substantially water-free fluid (1)) can be defined.

Different configurations are envisioned from the general description given above. For example, a shearing means (10) could be located at the junction point (8) where the substantially water-free fluid and water come into contact with one another. In this case a subsequent shearing means (10) and/or (18) could be located after where the recirculation line (13) and/or (20) comes back into the combined stream (9).

In another configuration, the product stream (14) goes directly from the regulator means (15) to the brownstock washer (19).

In another configuration the recycle streams (13) and (20) may be operational at the same time thus bringing two recycle streams simultaneously to the shearing means (10).

Example 4

A substantially water-free composition was prepared by mixing 44 parts of a silicone resin, 44 parts of a 100 cSt silicone fluid, 12 parts of a silicone polyether and 4 parts of an ethoxylated alcohol as an emulsifier.

A regenerative turbine pump (Burks, Model 3CT5M) was used as the shearing means (10) the regulating means (Swagelok stainless steel integral bonnet needle valve, 0.73 Cv, ½ inch Swagelok tube fitting, regulating stem; part No. SS-1RS8) (6) and (17) to regulate the flow of water (4), product stream (14) and recycled emulsion (13), respectively, were completely open, the total flow rate through the turbine pump was measured by a flowmeter (6) (VWR FRA700 Dual-Scale Flowmeter with ½ inch FNPT PVC Fittings, Catalog No. 97004-876) to be 10.5 liter/minute. By changing the setting on the regulating means (15), the flow rate of product stream (14) was varied without changing the total flow rate through the flow rate measuring means (11). Since the product flow subtracted from the total flow is the recycle flow rate (through line 13) it was possible to change the recycle ratio, by adjusting regulating means (15), from about 78% to 92%. The flow rate of the substantially water-free fluid was controlled by a metering pump (3) such that the % of substantially water-free fluid in the product was kept to 3%. In one experiment flowmeter (17) was shut in order to shut off the recirculation stream. The sample was passed through the regenerative turbine pump in a single pass. The total flow rate was controlled by decreasing the water flow through flow regulator (6). For each run, samples taken from the product stream (14) were measured for drop size using the Horiba test explained above. Table 3, shows how the recycle ratio affected the drop size of the emulsion generated by the above process.

TABLE 3

| Total Flow (ml/min.) | Recycle Ratio | Median Drop Size (μm) |
|---|---|---|
| 10500 | 92% | 10.71 |
| 10500 | 89% | 9.81 |
| 10500 | 86% | 9.54 |
| 10500 | 83% | 9.78 |
| 10500 | 80% | 9.75 |
| 10500 | 78% | 9.83 |
| 6385  | 0%  | 40.75 |
| 2476  | 0%  | 21.03 |

The data clearly show that while the median drop size is insensitive at high recycle ratios, when the recycle is completely shut off the drop size increases and becomes dependent on flow rate, which is not conducive to steady operation at a customer site where product demand may vary with time.

Example 5

A substantially water-free fluid with a composition described in Example 1 was prepared. An emulsion product was prepared in the same method as described in Example 4, where the recycle ratio was maintained at 86%. The water-free fluid flow rate was varied using the metering pump (1) to obtain emulsions with 3 different levels of active material.

A second conventional emulsion was made by using the formulation shown in Table 4.

TABLE 4

| Silicone Compound | 6.75 |
| Silicone fluid 100 cSt | 6.75 |
| Surf. 1 | 0.4 |
| Surf. 2 | 0.7 |
| Silicone polyether | 2 |
| CMC | 0.1 |
| xanthan gum | 0.425 |
| Water | 82.875 |

The active ingredients in the conventional formulation—silicone compound, silicone fluid and silicone polyether are the same as used to prepare the substantially water-free fluid. Surf. 1 and 2 are non-ionic surfactants needed to disperse the silicone drops and CMC (carboxymethylcellulose) and xanthan gum are two viscosifying polymers needed to maintain the stability of the conventional emulsion. The formulation in table 4 was combined to prepare an emulsion 15.5% active concentration.

The three emulsions made with substantially water-free fluid with the equipment depicted in FIG. 1 were measured for active solids level and their values were 4.5% (emulsion 1), 4.3% (emulsion 2) and 4.1% (emulsion 3). Separate foaming measurements were made with each of these when they were added to black liquor at a level of 25 ppm. The conventional emulsion was also evaluated in foaming measurements in three separate experiments where the actives level in the black liquor matched the level of emulsion 1, 2 and 3, respectively, in the black liquor. FIG. 2 shows the foaming tendency of the black liquor with the different defoamer emulsions relative to the black liquor without any defoamer.

In every case the addition of actives, whether from the freshly prepared emulsion or from a conventional emulsion formulation, decreases the ability of the black liquor to form a foam. That is, it takes longer to build the foam relative to the black liquor with no defoamer. Furthermore, it shows that the efficacy of defoaming (or reduced tendency to form a foam) is higher with emulsions made by the current invention as compared with the conventional emulsion made with thickeners, even when the amount of active ingredients added to the black liquor is identical. Thus, the method of making and using the emulsions according to the current invention is superior to the performance of emulsions made in the conventional method with viscosifiers. If the thickeners were eliminated from the conventional method of preparation, its defoaming performance would likely be similar to the current invention. However, the emulsion would have a very short life time, because of instant separation of the oil and water. Thus, according to the current invention, it is desired to feed the product as soon as possible to the washers to avoid the instability of the emulsion.

Example 6

A 1 ml drop of conventional defoamer made with viscosifiers, as in example 6, was dropped into a 500 ml container of black liquor at 85° C. The defoamer drop remained intact in the black liquor for over 1 hour with the microdrops of the active ingredients trapped within the 1 ml drop of the product.

A similar study was carried out using the emulsion of the current invention, where the active ingredients were dispersed in water without any thickeners present. The 1 ml drop of the product quickly dissipated in the black liquor with the micro drops of the active ingredients spreading on the surface of the black liquor.

The above example demonstrates that the viscosifiers used to provide long term stability to a product is detrimental to its ability to disperse within the black liquor system.

Example 7

A substantially water-free fluid as described in Example 4 was prepared. The equipment described above according to FIG. 1 and Example 4, was used to make the defoamer emulsions. The ratio of the substantially water-free fluid flow rate, which is controlled by a metering pump, to the water flow rate was adjusted to achieve an emulsion with a 5% concentration of active species. The flow rate of product into the product tank was controlled to 300 ml/minute. The total flow rate output from the centrifugal pump was measured by the rotameter (12) as 10 liter/minute. Thus the recycle ratio is calculated as 0.97. The product tank was initially filled with emulsion to a height of 45 centimeter (cm), and then the product was removed from the tank by a tube pump at a flow rate equal to the flow rate into the tank, so as to maintain a constant height within the tank. The contents of the tank were agitated by a propeller attached to a shaft rotating at a speed of 175 rpm. The steady state operation was carried out for a period of 150 minutes. Samples were taken from the product tank (8) and from the outlet of the tank (9). A Horiba LA-300 was used to measure the drop size of the emulsion for each sample.

In a second operation, the product flow rate into the tank was controlled to 2 liter/minute, while the product outflow was maintained at 300 ml/minute. As a result the tank level rose from empty to 45 cm in 25 minutes, at which point the product flow into the tank was stopped by shutting down the water flow and turning off the metering pump. Product continued to flow out of the tank until the level dropped to 10 cm, after which the product flow into the tank was restarted. As in the steady state mode, the contents of the tank were stirred. This mode of operation is called batch mode, and was carried out for three cycles, with samples being taken over time from the product exiting the tank.

Figure 3:
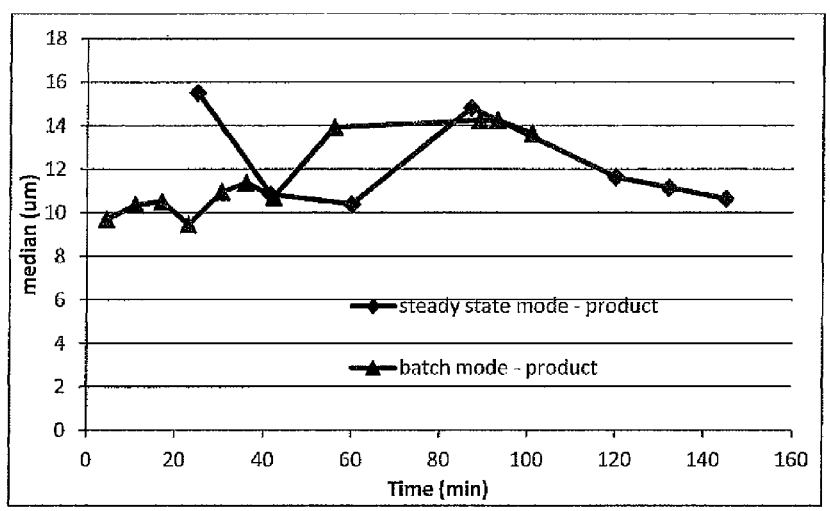
FIG. 3, shows the median drop size of the emulsion sampled from the product stream as a function of time for both the steady state mode and the continuous mode.

FIG. 3, shows the median drop size of the emulsion sampled from the product stream as a function of time for both the steady state mode and the continuous mode. This example demonstrates that the quality of the emulsion being fed by the present invention is consistent over time, regardless of the mode of operation.

We claim:
1. Method of washing a cellulosic furnish comprising;
  mixing one or more substantially water-free fluid(s) or composition(s) with water; and
  shearing the one or more substantially water-free fluid(s) or composition(s) and water with a shearing means having a shearing rate of at least 5000 s$^{-1}$ thereby producing an emulsion; and
  conveying the emulsion into a brownstock washing operation;
wherein the one or more substantially water-free fluid(s) or composition(s) has a Brookfield viscosity of less than about 70,000 centipoise (cps) when measured at 25° C. with a #6 spindle; and wherein the emulsion is conveyed into a brownstock washing vessel within 8 hours of preparing the emulsion.

2. The method of claim 1, wherein the ratio of the one or more substantially water-free fluid(s) or composition(s) to water is from about 1:1 to 1:100.

3. The method of claim 1, wherein the viscosity of the water portion of the emulsion increases by no more than a factor of 10.

4. Method of claim 1, wherein at least one substantially water-free fluid or composition comprises a silicone resin.

5. The method of claim 1, wherein at least one substantially water-free fluid or composition comprises a silicone polyether.

6. The method of claim 5, wherein the polyether portion of the silicone polyether is a mixture of propylene oxide and ethylene oxide.

7. The method of claim 1, wherein at least one substantially water-free fluid or composition comprises an emulsifier.

8. The method of claim 7, wherein the emulsifier has an HLB of greater than 5.

9. The method of claim 7, wherein the amount of emulsifier is from about 1% to about 10% by weight of the total emulsion.

10. The method of claim 7, wherein the emulsifier is selected from triblock copolymers of ethylene oxide and propylene oxide, ethoxylated fatty acids, and ethoxylated fatty alcohol, ethoxylated sorbitan esters with fatty alcohols, anionic surfactants with sulfonate, carboxylate and sulfate species, silicone polyethers.

11. The method of claim 1, wherein more than one of the substantially water-free fluids or compositions are mixed prior to mixing with the water.

12. The method of claim 1, wherein the ratio of the feed rates of more than one substantially water-free composition is set by the amount of defoaming and drainage required in the brownstock washing operation.

13. The method of claim 1, wherein the total amount of substantially water free compositions comprise from about 1% to about 30% by weight of the total emulsion.

14. The method of claim 1, wherein at least 10% of the total amount of the emulsion exiting the shearing means is recycled back through the shearing means, prior to feeding the emulsion to the brownstock washer.

15. The method of claim 14, wherein at least 50% of the total amount of the emulsion exiting the shearing means is recycled back through the shearing means, prior to feeding the emulsion to the brownstock washer.

16. The method of claim 15, wherein greater than 90% of the total amount of the emulsion exiting the shearing means is recycled back through the shearing means, prior to feeding the emulsion to the brownstock washer.

17. The method of claim 1, where the resulting emulsion from the shearing means is stored temporarily in a storage vessel, with or without agitation.

18. The method of claim 17, wherein at least 10% of the emulsion in temporary storage is recycled back through the shearing means before being conveyed to the brownstock washer.

19. The method of claim 1, where the shearing means is a centrifugal pump, turbine pump, single stage homogenizers, multistage homogenizers and combinations thereof.

* * * * *